United States Patent
Höfel et al.

(10) Patent No.: US 7,915,782 B2
(45) Date of Patent: Mar. 29, 2011

(54) ELECTRICAL MACHINE AND METHOD OF RETROFITTING AN ELECTRICAL MACHINE

(75) Inventors: Mark Höfel, Neuss (DE); Udo Winkelmann, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 11/992,715

(22) PCT Filed: Sep. 20, 2006

(86) PCT No.: PCT/EP2006/066552
§ 371 (c)(1),
(2), (4) Date: Mar. 27, 2008

(87) PCT Pub. No.: WO2007/036471
PCT Pub. Date: Apr. 5, 2007

(65) Prior Publication Data
US 2009/0021102 A1    Jan. 22, 2009

(30) Foreign Application Priority Data
Sep. 27, 2005   (EP) .................................... 05021078

(51) Int. Cl.
H02K 13/00   (2006.01)
H02K 9/28    (2006.01)
H02K 13/12   (2006.01)
H01R 39/08   (2006.01)
H01R 39/04   (2006.01)

(52) U.S. Cl. ........ 310/228; 310/227; 310/229; 310/232; 310/233; 310/248

(58) Field of Classification Search ................... 310/228, 310/227, 232, 233, 248, 229
See application file for complete search history.

(56) References Cited

U.S. PATENT DOCUMENTS

| 6,707,217 | B1 * | 3/2004 | Zwarg et al. ................. 310/228 |
| 2003/0168083 | A1 | 9/2003 | Jenkins |
| 2004/0100159 | A1 | 5/2004 | Li |

FOREIGN PATENT DOCUMENTS

| JP | 56103951 A | 8/1981 |
| JP | 01085549 A | 3/1989 |
| JP | 05266957 A * | 10/1993 |
| JP | 06153461 A * | 5/1994 |
| JP | 09247914 A * | 9/1997 |
| WO | WO 0069049 A | 11/2000 |

OTHER PUBLICATIONS

Machine Translation JP05266957A (1993).*
Derwent Text Translation (Purpose and Constitution) JP05266957 (1993) and (Abstract and Solution) JP09247914 (1997).*
Machine Translation JP06153461 (1994).*

* cited by examiner

*Primary Examiner* — Quyen Leung
*Assistant Examiner* — Jose A Gonzalez Quinones

(57) ABSTRACT

There is described an electrical machine with a rotor shaft, a slip ring, arranged on the rotor shaft, and at least two sliding contacts arranged along the circumference of the slip ring for producing an electrical connection with the slip ring. The electrical machine has one or more extraction devices arranged between the at least two sliding contacts directly via the slip ring and intended for extracting abraded material produced at the slip ring.

12 Claims, 2 Drawing Sheets

ELECTRICAL MACHINE AND METHOD OF RETROFITTING AN ELECTRICAL MACHINE

CROSS REFERENCE TO RELATED APPLICATIONS

This application is the US National Stage of International Application No. PCT/EP2006/066552, filed Sep. 20, 2006 and claims the benefit thereof. The International Application claims the benefits of European Patent Office application No. 05021078.0 EP filed Sep. 27, 2005, both of the applications are incorporated by reference herein in their entirety.

FIELD OF INVENTION

The invention relates to an electrical machine with a rotor shaft, a slip ring, which is arranged on the rotor shaft, and at least two sliding contacts, which are arranged along the circumference of the slip ring, for producing an electrical connection with the slip ring. In addition, the invention relates to a method of retrofitting an electrical machine with a rotor shaft, a slip ring, which is arranged on the rotor shaft, and at least two sliding contacts, which are arranged along the circumference of the slip ring, for producing an electrical connection with the slip ring.

BACKGROUND OF INVENTION

An electrical machine converts mechanical energy into electrical energy or electrical energy into mechanical energy. Depending on the use, the generator mode (conversion of mechanical energy into electrical energy) or the motor mode (conversion of electrical energy into mechanical energy) is referred to. In the case of electrical machines operated as a generator, a distinction is drawn between DC generators and AC generators.

In the case of DC generators, an electrical direct current is produced during rotation of a rotor shaft in an armature of the generator, and this electrical direct current is tapped off via a slip ring, which is fixed on the rotor shaft, by means of a sliding contact, such as a Carbon brush, for example. In the case of AC generators, slip rings are fitted to the end of a rotor shaft. During operation of the AC generator, current is supplied to the field winding from the outside via sliding contacts, such as carbon brushes, for example, which slide on the slip rings. In the process, the field winding produces a magnetic exciter field in the region of a stator winding surrounding it. During rotation of the rotor, an alternating current is induced in the coil windings of the stator.

In the case of electrical machines of the type mentioned at the outset, abraded material arises as a result of the abrasion of the sliding contacts, such as the carbon brushes, for example, on the slip rings, and this abraded material can result in electrical flashovers at the components installed there. The arcs produced in the process can result in severe damage to the installed components and the rotor shaft. In the case of conventional electrical machines, this abraded material is carried along in an uncontrolled manner in the area surrounding the slip rings by means of an air flow, which is produced by the rotary movement of the slip rings themselves or by fans.

Other electrical machines known in the prior art have suction rings, which completely surround the rotor shaft in annular fashion. These suction rings are arranged in the axial direction of the rotor shaft between two slip ring sections. In this case, the slip rings are split in the center into two slip ring sections, which extend around the entire rotor shaft. Since the sliding contacts are each arranged directly over the slip ring sections, the suction rings are arranged between sliding contacts in the axial direction of the rotor shaft. The suction rings are therefore located laterally offset with respect to the corresponding slip rings. This suction device known in the prior art requires considerable complexity in terms of construction and, as a result of the lateral offset of the suction rings with respect to the slip ring surface, does not allow optimum suction.

SUMMARY OF INVENTION

An object on which the invention is based on is improving an electrical machine of the type mentioned at the outset and a method of retrofitting an electrical machine of the type mentioned at the outset to the extent that an accumulation of abraded material on the slip ring can be effectively avoided in a cost-efficient manner, in particular in the case of electrical machines which are already in use.

This object is achieved according to the invention by a generic electrical machine which has a suction device, which is arranged between the at least two sliding contacts directly over the slip ring, for sucking away abraded material produced on the slip ring. Furthermore, the object is achieved by a generic method, which is characterized by an arrangement of a suction device for sucking away abraded material produced on the slip ring at a position between the at least two sliding contacts directly over the slip ring.

According to the invention, the suction device is therefore arranged between the at least two sliding contacts, which are arranged along the circumference of the slip ring. This means that the suction device is located substantially on a direct connecting line between the sliding contacts along the circumference of the slip ring. The suction device is therefore arranged in an interspace between the sliding contacts and is therefore located directly over the slip ring surface, i.e. offset slightly towards the outside in the radial direction of the slip ring. The suction device can therefore suck away abraded material located on the slip ring surface directly after it has been produced.

The complexity of the suction device in terms of construction is low in comparison with the conventional suction method by means of suction rings since the suction device is arranged at previously unused interspaces between the sliding contacts. It is therefore not necessary to modify the sliding contacts. The method according to the invention is therefore particularly well suited for retrofitting an electrical machine with a suction device. The existing component parts of the electrical machine do not need to be changed or even exchanged. In the case of the electrical machine according to the invention, abraded material, in particular carbon dust, is effectively prevented from being deposited on the slip ring surface. Damage by means of voltage flashovers on the basis of carbon dust on all the components in the slip ring area is therefore actively prevented. Furthermore, as a result of the suction the air exchange in the region of the slip ring is also increased, as a result of which the slip rings are additionally cooled. As a result of the increased amount of air required in the slip ring area, the air needs to be supplied through suitable filters. As a result, the rate of wear of the slip ring and the sliding contacts is improved if the generator is positioned in a dirty environment.

In an advantageous embodiment, the electrical machine has at least one further slip ring, which is arranged on the rotor shaft and is designed in particular for an electrical potential which is different than the electrical potential provided for the first slip ring, the suction device having a suction connection piece, which extends transversely with respect to the circumferential direction of the slip rings and covers one or more of the slip rings. Advantageously, at least two further sliding contacts are associated with the further slip ring. The respective sliding contacts of the further sliding contacts are in particular in each case arranged on one axis with the corresponding first sliding contacts. These axes are advantageously each parallel to the axis of the rotor shaft. The suction connection piece, which extends parallel to the rotor axis, as a result of the fact that it covers a plurality of slip rings, allows for particularly efficient suction of abraded material produced on said slip rings. In particular, this suction covering the slip rings is also possible in the case of slip rings with a different electrical potential, which further increases the versatility of the suction device according to the invention.

In order to achieve an optimum suction effect, it is expedient if a gap is provided between the suction device and the slip ring. This gap represents a radial separation of the suction device from the slip ring. In particular, the gap width is selected in such a way that the air sucked in between the slip ring and the suction device attains optimum flow for carrying along the abraded material located on the slip ring. The gap between the suction device according to the invention and the slip ring furthermore prevents the suction device from sliding along the slip ring and therefore damage to the suction device or the slip ring.

The adjustable gap ensures optimum matching of the suction device even after inspections (long operating times) if the slip ring has worn out on the surface and needs to be skimmed, as a result of which it attains a smaller rated diameter.

In an expedient embodiment, the suction device has a suction direction, which is oriented radially with respect to the rotor shaft. In particular, the suction device has a longitudinal axis oriented in the suction direction. Such a suction device therefore advantageously protrudes radially from the rotor shaft. The suction direction which, in accordance with the embodiment according to the invention, is oriented radially with respect to the rotor shaft allows for particularly efficient suction of the abraded material produced on the slip ring. The abraded material is in the process sucked away from the slip ring from above as in the case of a vacuum cleaner.

In an advantageous embodiment, the electrical machine has at least three sliding contacts, which are arranged along the circumference of the slip ring, and at least one further suction device, which is arranged opposite the first suction device at another interspace between individual sliding contacts of the at least two sliding contacts. In this case, at least two of the suction devices are connected to a central suction line via a pipeline system. Owing to the fact that it is possible to operate at least two of the suction devices via a central suction line, the amount of space required for the pipelines required in the electrical machine can be kept low. The suction preferably takes place by means of a vacuum unit, which is coupled to the central suction line. Advantageously, an electrical machine according to the invention has a plurality of, in particular two, suction device groups, which are arranged along the circumference of the slip ring(s) and are each connected to the central suction lines.

Advantageously, the electrical machine is designed as an electrical generator. Alternatively, the electrical machine can also be designed as a single-phase machine.

In an advantageous embodiment of the method according to the invention, the electrical machine has at least one further slip ring, which is arranged on the rotor shaft and is designed for an electrical potential which is different than the electrical potential provided for the first slip ring. Furthermore, the suction device is provided with a suction connection piece, which extends transversely with respect to the circumferential direction of the slip rings, the suction connection piece being arranged in such a way that it extends transversely with respect to the circumferential direction of the slip rings.

The features cited with respect to the abovementioned advantageous embodiments of the electrical machine according to the invention are transferred correspondingly to the method according to the invention for retrofitting an electrical machine. The advantages mentioned above with regard to the advantageous embodiments of the electrical machine according to the invention therefore also relate to the corresponding advantageous embodiments of the method according to the invention.

BRIEF DESCRIPTION OF THE DRAWINGS

An exemplary embodiment of an electrical machine in the form of an electrical generator will be explained in more detail below with reference to the attached schematic drawings, in which.

DETAILED DESCRIPTION OF INVENTION

Figure 1:
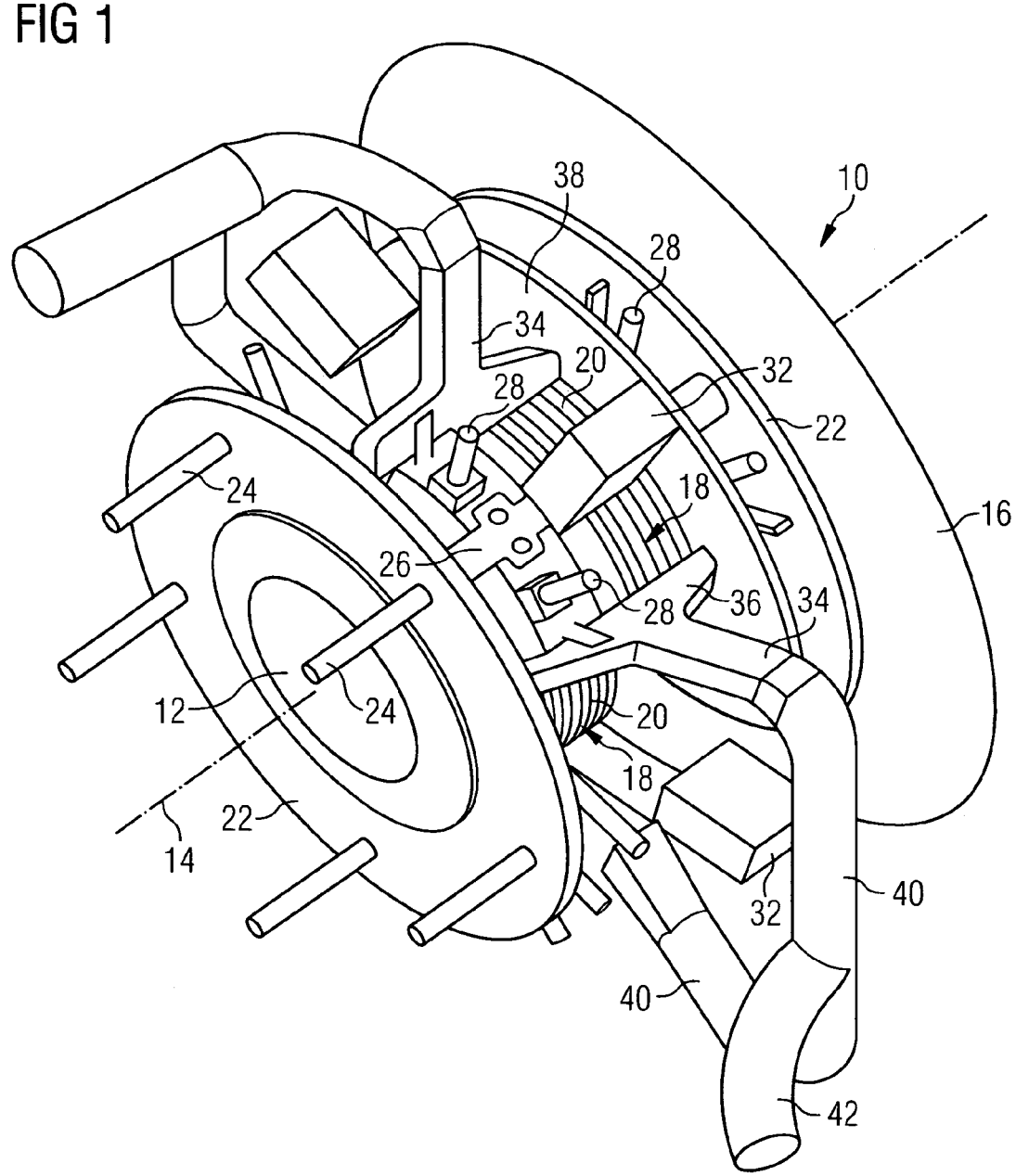
FIG. 1 shows a perspective view at an angle from above of an exemplary embodiment of an electrical machine according to the invention.
Figure 2:
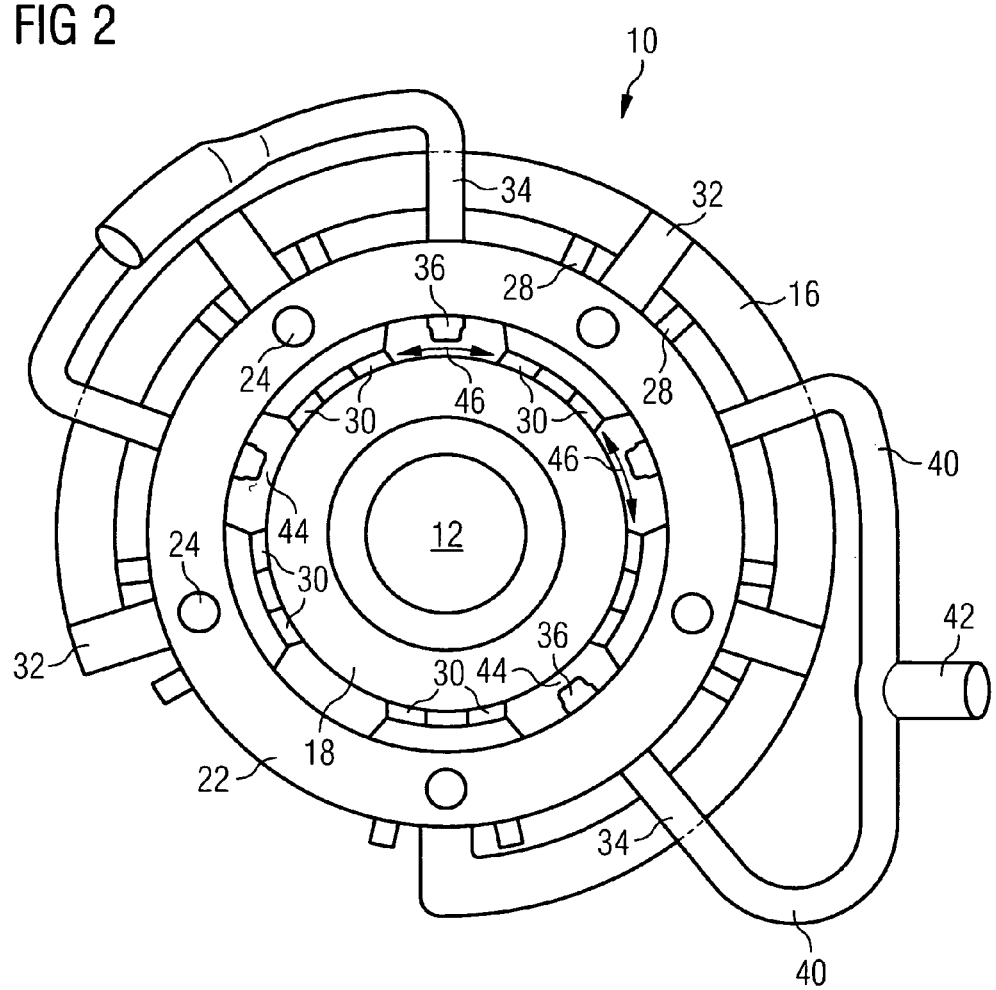
FIG. 2 shows a plan view of the electrical machine shown in FIG. 1 with a viewing direction along a rotor shaft of the electrical machine.

FIGS. 1 and 2 show an exemplary embodiment according to the invention of an electrical generator 10 in different views. The electrical generator 10 is in particular designed for use in a thermal power station, such as a steam power station, for example, and has a centrally running rotor shaft 12. The rotor shaft 12 surrounds a rotor axis 14 and runs through a carrier plate 16. Two slip rings 18 are provided axially offset on the surface of the rotor shaft 12. The two slip rings 18 preferably have different electrical potentials. Slip ring grooves 20, which are spaced axially apart parallel, run on the respective surface of the two slip rings 18. During operation, a plurality of sliding contacts 30 in the form of carbon brushes slide along these slip ring grooves 20. The sliding contacts 30 are arranged uniformly along the circumference of the respective slip ring 18. In each case, one interspace 46 is provided between the sliding contacts. The sliding contacts 30 are fixed on brush pins 24 via plug-type brushholders 28 and brushholders 26. Each of five brush pins 24 provided in the embodiment shown extends through front and rear insulating plates 22 and holds in each case two sliding contacts 30, one for the front slip ring 18 and one for the rear slip ring 18. A holding part 32 is located on each brush pin 24 between the brushholders 26 associated with the respective slip rings 18.

In each case one suction device 34 is arranged in the circumferential direction between the respective sliding contacts 30, which are arranged on a brush pin 24. The respective suction device 34 has a suction connection piece 36, which extends over the two slip rings 18. A gap 44 is located between the suction connection piece 36 and the surface of the respective slip ring 18. In the generator mode, abraded material, in particular carbon dust, produced as a result of the friction between the sliding contacts 30 and the slip rings 18, is sucked away by means of the suction devices 34, which are arranged along the circumference of the slip rings 18. The suction devices 34 can each be connected in pairs to a central suction line 42 via individual suction lines 40. The central suction lines 42 are in turn connected to a vacuum unit for producing the suction action. The suction devices 34 are fixed on a holding ring 38, which runs around the rotor shaft 12.

The invention claimed is:

1. An electrical machine, comprising:
   a rotor shaft;
   a slip ring arranged on the rotor shaft;
   at least two sliding contacts arranged along a circumference of the slip ring, to provide an electrical connection with the slip ring;
   a suction device arranged between the at least two sliding contacts directly over the slip ring;
   a vacuum unit coupled to the suction device for sucking away in response to a vacuum produced by the vacuum unit abraded material produced on the slip ring, wherein the suction device is arranged to have a suction direction oriented substantially radially relative to the circumference of the rotor shaft;
   at least one further slip ring arranged on the rotor shaft; and
   a suction connection piece extending transversely with respect to the circumferential direction of the slip rings and covering at least one or two of the slip rings.

2. The electrical machine as claimed in claim 1, wherein the further slip ring is capable of an electrical potential different from the electrical potential of the first slip ring.

3. The electrical machine as claimed in claim 1, wherein a gap is between the suction device and the slip ring.

4. The electrical machine as claimed in claim 1, further comprising at least three sliding contacts arranged along a circumference of the slip ring, and at least one further suction device arranged opposite the first suction device at another interspace between individual sliding contacts of the at least two sliding contacts, wherein one or more of the suction devices are connected to a central suction line via a pipeline system.

5. The electrical machine as claimed in claim 2, further comprising at least three sliding contacts arranged along a circumference of the slip ring, and at least one further suction device arranged opposite the first suction device at another interspace between individual sliding contacts of the at least two sliding contacts, wherein one or more of the suction devices are connected to a central suction line via a pipeline system.

6. The electrical machine as claimed in claim 3, further comprising at least three sliding contacts arranged along a circumference of the slip ring, and at least one further suction device arranged opposite the first suction device at another interspace between individual sliding contacts of the at least two sliding contacts, wherein one or more of the suction devices are connected to a central suction line via a pipeline system.

7. The electrical machine as claimed in claim 1, further comprising at least three sliding contacts arranged along a circumference of the slip ring, and at least one further suction device arranged opposite the first suction device at another interspace between individual sliding contacts of the at least two sliding contacts, wherein one or more of the suction devices are connected to a central suction line via a pipeline system.

8. The electrical machine as claimed in claim 1, wherein the electrical machine is an electrical generator.

9. A method of retrofitting an electrical machine, comprising:
   providing the electrical machine having:
      a rotor shaft;
      a slip ring arranged on the rotor shaft;
      at least two sliding contacts arranged along a circumference of the slip ring, for producing an electrical connection with the slip ring;
      an arrangement of a suction device coupled to a vacuum unit for sucking away in response to a vacuum generated by the vacuum unit abraded material produced on the slip ring being provided at a position between the at least two sliding contacts directly over the slip ring; and
      at least one further slip ring arranged on the rotor shaft and designed for an electrical potential which is different from an electrical potential provided for the first slip ring;
   providing the suction device with a suction connection piece, which extends transversely with respect to the circumferential direction of the slip rings;
   arranging the suction device to have a suction direction oriented substantially radially relative to the circumference of the rotor shaft; and
   arranging the suction connection piece such that the piece extends transversely with respect to the circumferential direction of the slip rings and covers at least one or two slip rings.

10. The method as claimed in claim 9, wherein a gap is between the suction device and the slip ring.

11. The method as claimed in claim 9, wherein at least three sliding contacts are arranged along a circumference of the slip ring, wherein at least one further suction device is arranged opposite the first suction device at a different interspace between individual sliding contacts of the at least two sliding contacts, wherein one or more of the suction devices are connected to a central suction line via a pipeline system.

12. The method as claimed in claim 9, wherein the electrical machine is a electrical generator.

* * * * *